US011247825B2

(12) United States Patent
Ward et al.

(10) Patent No.: US 11,247,825 B2
(45) Date of Patent: Feb. 15, 2022

(54) PACKAGE IMPACT INDICATOR(S) REGISTERING LOCATION AND ELAPSED TIME FROM IMPACT

(71) Applicant: INTERNATIONAL BUSINESS MACHINES CORPORATION, Armonk, NY (US)

(72) Inventors: Brett Ward, Raleigh, NC (US); William J. Green, Cary, NC (US); Callum Foshee, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 926 days.

(21) Appl. No.: 15/997,933

(22) Filed: Jun. 5, 2018

(65) Prior Publication Data
US 2019/0367238 A1 Dec. 5, 2019

(51) Int. Cl.
*B65D 79/02* (2006.01)
*G01P 15/03* (2006.01)
*G01P 15/06* (2006.01)

(52) U.S. Cl.
CPC ............ *B65D 79/02* (2013.01); *G01P 15/036* (2013.01); *G01P 15/06* (2013.01)

(58) Field of Classification Search
CPC .......... B65D 81/03; G01K 3/04; G01N 31/22; G01N 31/229; G01L 5/0052; G01P 15/06; G01P 15/036
See application file for complete search history.

(56) References Cited

U.S. PATENT DOCUMENTS

| 3,515,091 | A | * | 6/1970 | Smith | .................. | G01P 15/036 |
| | | | | | | 116/203 |
| 3,620,677 | A | * | 11/1971 | Morison | ................ | B01D 15/08 |
| | | | | | | 422/423 |
| 3,835,809 | A | | 9/1974 | Sinn, Jr. | | |
| 3,899,295 | A | | 8/1975 | Halpern | | |
| 3,996,007 | A | | 12/1976 | Fang et al. | | |

(Continued)

OTHER PUBLICATIONS

Haas, David, "Times-up! The Color-Changing Self-Expiring Badge," Chemical Innovation, vol. 31, No. 2, Feb. 2001 (pp. 42-51).

(Continued)

*Primary Examiner* — Helen C Kwok
(74) *Attorney, Agent, or Firm* — Tihon Poltavets, Esq.; Kevin P. Radigan, Esq.; Heslin Rothenberg Farley & Mesiti P.C.

(57) ABSTRACT

Impact indicators which include an impact registering structure are provided for a package. The impact registering structure registers a location and an elapsed time of an impact of excessive force on the package. The structure includes a first region, a second region, and a barrier film. The first region contains a first element, and the second region contains a second element. The first and second elements are selected to register the location and the elapsed time of the impact when coming in contact. The barrier film separates the first and second regions, and is calibrated to rupture with a specified impact force. Once ruptured, the first element and the second element contact, in part, to provide a location indication of the rupture in the barrier film and a time elapsed indication indicative of the elapsed time from the rupture in the barrier film.

19 Claims, 8 Drawing Sheets

(56) References Cited

U.S. PATENT DOCUMENTS

| | | | |
|---|---|---|---|
| 4,098,577 A | 7/1978 | Halpern | |
| 4,502,605 A | 3/1985 | Wloszczyna | |
| 4,760,919 A | 8/1988 | Pereyra | |
| 4,890,763 A | 1/1990 | Curiel | |
| 5,323,729 A * | 6/1994 | Rubey | G01P 15/036 116/200 |
| 5,930,206 A * | 7/1999 | Haas | G04F 1/00 368/327 |
| 6,544,925 B1 | 4/2003 | Prusik et al. | |
| 6,741,523 B1 * | 5/2004 | Bommarito | G01K 3/04 116/220 |
| 7,174,277 B2 | 2/2007 | Vock et al. | |
| 7,647,809 B1 * | 1/2010 | Cooney | G01L 5/0052 73/12.01 |
| 8,033,715 B2 | 10/2011 | Perez-Luna et al. | |
| 2002/0000184 A1 * | 1/2002 | Paton | G01N 31/229 116/206 |
| 2007/0197383 A1 * | 8/2007 | Koene | G01D 7/005 503/201 |
| 2008/0224879 A1 * | 9/2008 | Zadesky | G01P 15/06 340/653 |
| 2010/0263244 A1 | 10/2010 | Tabirian et al. | |
| 2012/0225294 A1 * | 9/2012 | Georgeson | G01L 1/247 428/402.2 |
| 2012/0312071 A1 * | 12/2012 | Branch | G01P 15/04 73/12.07 |
| 2014/0318436 A1 * | 10/2014 | Schonberg | G01P 15/06 116/203 |
| 2015/0308907 A1 | 10/2015 | Georgeson et al. | |
| 2018/0186545 A1 * | 7/2018 | Zocher | B32B 27/08 |

OTHER PUBLICATIONS

Shockwatch, "ShockWatch Label," https://www.spotsee.io/impact/shockwatch-label, [Retrieved from Internet on Mar. 2, 2018] (8 pages).

* cited by examiner

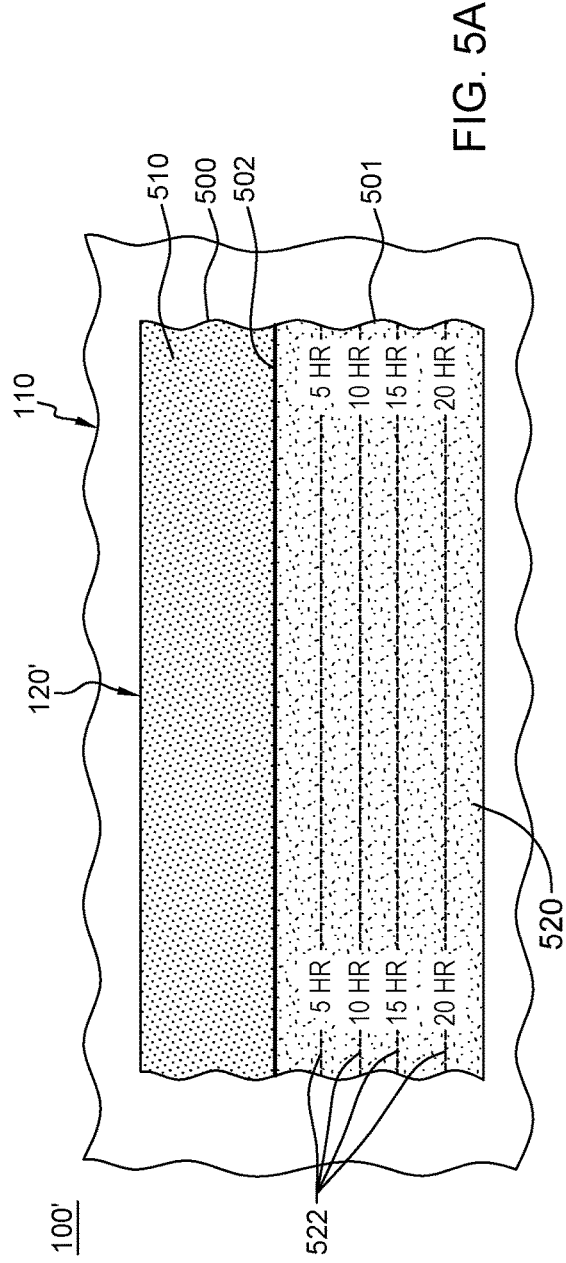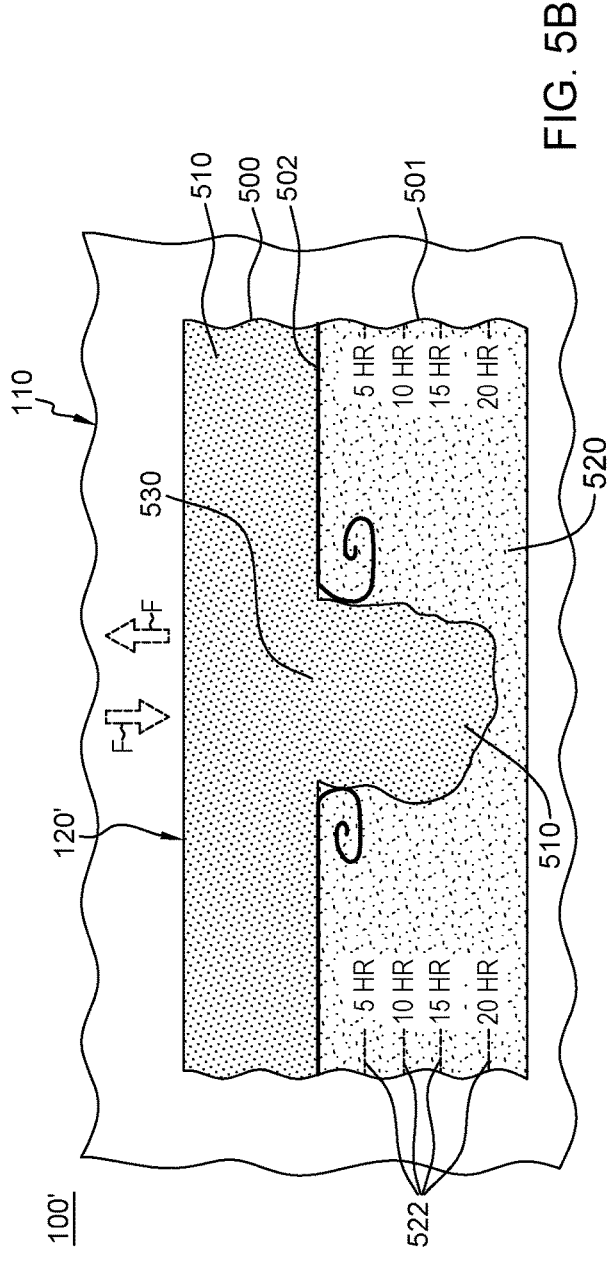

PACKAGE IMPACT INDICATOR(S) REGISTERING LOCATION AND ELAPSED TIME FROM IMPACT

BACKGROUND

Millions of packages are shipped around the world every day. Many packaged products may be sensitive to excessive force or shock, and may be damaged if subject to an impact force above a specified level. For instance, electronic equipment, such as computer equipment, may have sensitive components which may be damaged upon experiencing a force above a specified impact value. Further, depending on the nature and destination of a package shipment, the package may change hands or ownership numerous times before finally being delivered to a customer. Therefore, determining a party responsible for damage to a shipped package may be difficult.

There are currently a number of relatively complex electrical, mechanical and/or electromechanical devices which may be used to identify when excessive force or shock has impacted a package. Such devices have a tendency to be expensive to manufacture though, restricting widespread use of the devices.

SUMMARY

Certain shortcomings of the prior art are overcome and additional advantages are provided through the provision, in one or more aspects, of an impact indicator for a package. The impact indicator includes an impact registering structure to register, when associated with the package, a location and an elapsed time of an impact of excessive impact force on the package. The impact registering structure includes a first region, a second region, and a barrier film. The first region contains a first element, and the second region contains a second element. The first and second elements are selected to register the location and the elapsed time of the impact when coming in contact due to the impact. The barrier film separates the first and second regions, and is calibrated to rupture with a specified impact force. Once ruptured, the first element and the second element contact, in part, to provide a location indication of the rupture in the barrier film and a time elapsed indication indicative of elapsed time from the rupture in the barrier film.

In another aspect, an assembly is provided which includes a package, and an impact indicator associated with the package. The impact indicator includes an impact registering structure coupled to the package for registering a location and an elapsed time of an impact of excessive impact force on the package. The impact registering structure includes a first region, a second region, and a barrier film. The first region contains a first element, and the second region contains a second element. The first and second elements are selected to register the location and the elapsed time of the impact when coming in contact due to the impact. The barrier film separates the first and second regions, and is calibrated to rupture with a specified impact force. Once ruptured, the first element and the second element contact, in part, to provide a location indication of the rupture in the barrier film and a time elapsed indication indicative of an elapsed time from the rupture in the barrier film.

In a further aspect, a method of fabricating an impact indicator for a package is provided. The method includes providing an impact registering structure to register, when associated with the package, a location and an elapsed time of an impact of excessive impact force on the package. Providing the impact registering structure includes providing a first region containing a first element, and providing a second region containing a second element. The first element and the second element are selected to register the location and an elapsed time of the impact when coming in contact due to the impact. Further, the method includes separating the first and second regions by a barrier film. The barrier film is calibrated to rupture with a specified impact force, and once ruptured, the first element and the second element contact, in part, to provide a location indication of the rupture in the barrier film and a time elapsed indication indicative of the elapsed time from the rupture.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5A is a plan view of another embodiment of an assembly including an impact indicator affixed to a package, in accordance with one or more aspects of the present invention;

FIG. 5B depicts the impact indicator of FIG. 5A after an excessive impact force has been applied, resulting in a rupture in the barrier film and a contacting of the first and second elements of the impact registering structure, in accordance with one or more aspects of the present invention.

DETAILED DESCRIPTION

Figure 1A:
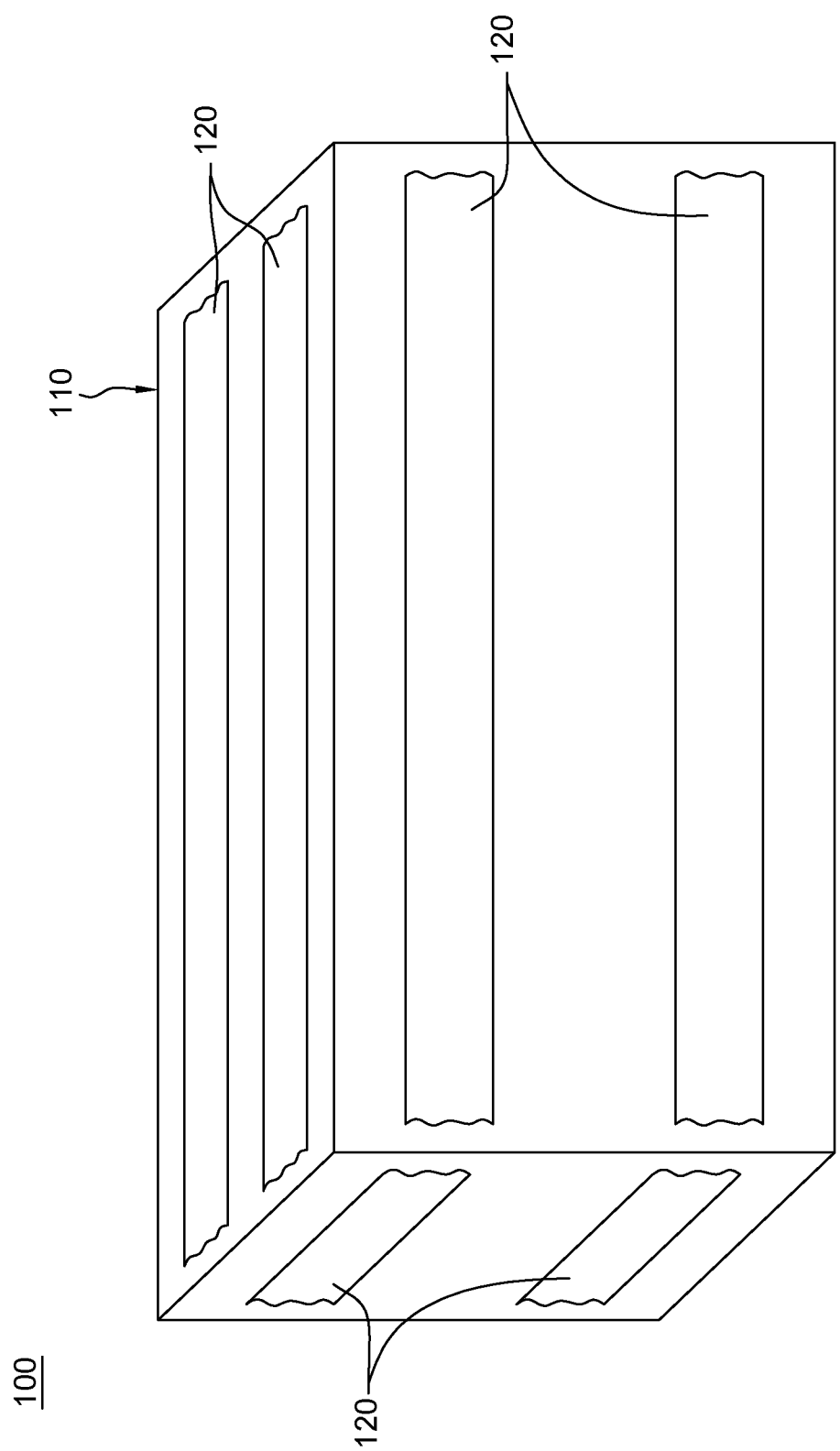
FIG. 1A depicts one embodiment of a package with impact indicators applied thereto in the form of a tape, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and the specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, providing an impact indicator to register location of, and elapsed time from, an excessive impact force on a package, where the excessive impact is any impact or shock above a specified or set impact force.

The illustrative embodiments may be described below using specific designs, architectures, protocols, layouts, schematics, or tools only as examples, and are not limited to the illustrative embodiments. The illustrative embodiments may be used in conjunction with other comparable or similarly purposed structures, systems, applications, or architectures.

The examples in this disclosure are used only for clarity of description and are not limiting to the illustrative embodiments. Additional operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

As noted, many products manufactured today may be sensitive to excessive force or shock, such as may occur during shipment. For instance, when unloading or loading a shipping container, a package or container containing the package, may be dropped, such as from a forklift. Also, the package may be subject to excessive acceleration or deceleration forces during shipment. When the shock or force impacting on the package exceeds a specified acceptable, or calibrated, impact force for a package, then the product being shipped may be damaged.

There are a variety of techniques to determine if a package seal has been tampered with, broken or compromised. There is even a shock indicator that may be triggered at a specified force tolerance to indicate a dropped or mishandled package. These tools and devices are helpful, but they are unable to resolve a product damage claim between, for instance, an end customer and multiple carriers who handled the package during shipment, that is, without the use of expensive electronic recording devices on the package that would require data retrieval, data transmission, maintenance and a source of power. Thus, disclosed herein, in one or more aspects, is an impact indicator that can register an excessive impact force on a package, and also provide a relative time when the force (and thus the damage) occurred, without the use of an electronic-based device or source of power.

Generally stated, disclosed herein are impact indicators, or indicator systems and methods that allow a receiver of a package to determine if there has been an excessive impact force, stress, puncture, etc. (collectively referred to herein an impact force) on the package, such as during transit, and an approximate amount of time since the excessive impact force occurred. Advantageously, the impact indicators and methods disclosed herein do not require an electrical power source, or any means of transmitting data.

Generally stated, impact indicators are disclosed herein for a package. In one or more aspects, the impact indicator includes an impact registering structure to register, when associated with a package, a location and an elapsed time of an impact of excessive impact force on the package. The impact registering structure includes a first region, a second region, and a barrier film. The first region contains a first element, which in one or more embodiments may be a liquid element, and the second region contains a second element. The first and second elements are selected to register the location and the elapsed time of the impact when coming in contact due to the impact. The barrier film separates the first and second regions, and is calibrated or designed to rupture with a specified impact force. Once ruptured, the first element and the second element contact, in part, to provide a location indication of the rupture in the barrier film, and a time elapsed indication indicative of the elapsed time from the rupture in the barrier film, and thus, from the impact on the package.

In one or more implementations, the impact registering structure may be a multilayer structure, where the first region is a first layer, and the second region is a second layer, with the first and second layers being separated by the barrier film. In one or more embodiments, the first element in the first layer may be or include a colorimetric element (or colorimetric chemical), and the second element of the second layer may be or include an activating agent for the colorimetric element. The colorimetric element changes color in a time elapsed manner in a region of exposure to the activating agent, that is, in the region of the rupture in the barrier film. By way of example, the colorimetric element may include a PH sensitive dye, and the activating agent may be an acid or base suspended in a neutral liquid which reacts with the colorimetric element. In one or more embodiments, the barrier film may be a thin film calibrated, or designed and constructed, to rupture with a specified impact force (or G-force) perpendicular to the impact registering structure.

In one or more other implementations, the first region and the second region may be coplanar regions of the impact registering structure separated by the barrier film. Further, in one or more embodiments, the first element may be or include an indicator dye, such as a liquid dye, and the second element may be or include an absorbing agent for the dye, where rupture of the barrier film results in the first element being partially absorbed into the second element, with the location of the absorption providing the location indication of the rupture in the barrier film and a rate of absorption providing the time elapsed indication indicative of elapsed time from the rupture in the barrier film. By way of example, the barrier film may be calibrated (i.e., designed and constructed) to rupture with a specified impact force planar to the impact registering structure.

In one or more embodiments, the location indication resides, in part, within at least one of the first region or the second region at a position of the barrier film within the impact registering structure experiencing the excessive impact force, that is, where rupturing. In one or more embodiments, the impact registering structure may further include an adhesive on at least one side thereof to facilitate adhering the impact registering structure to the package. The adhesive may be coupled to at least one of the first region or the second of the impact registering structure, by way of example.

Figure 1B:
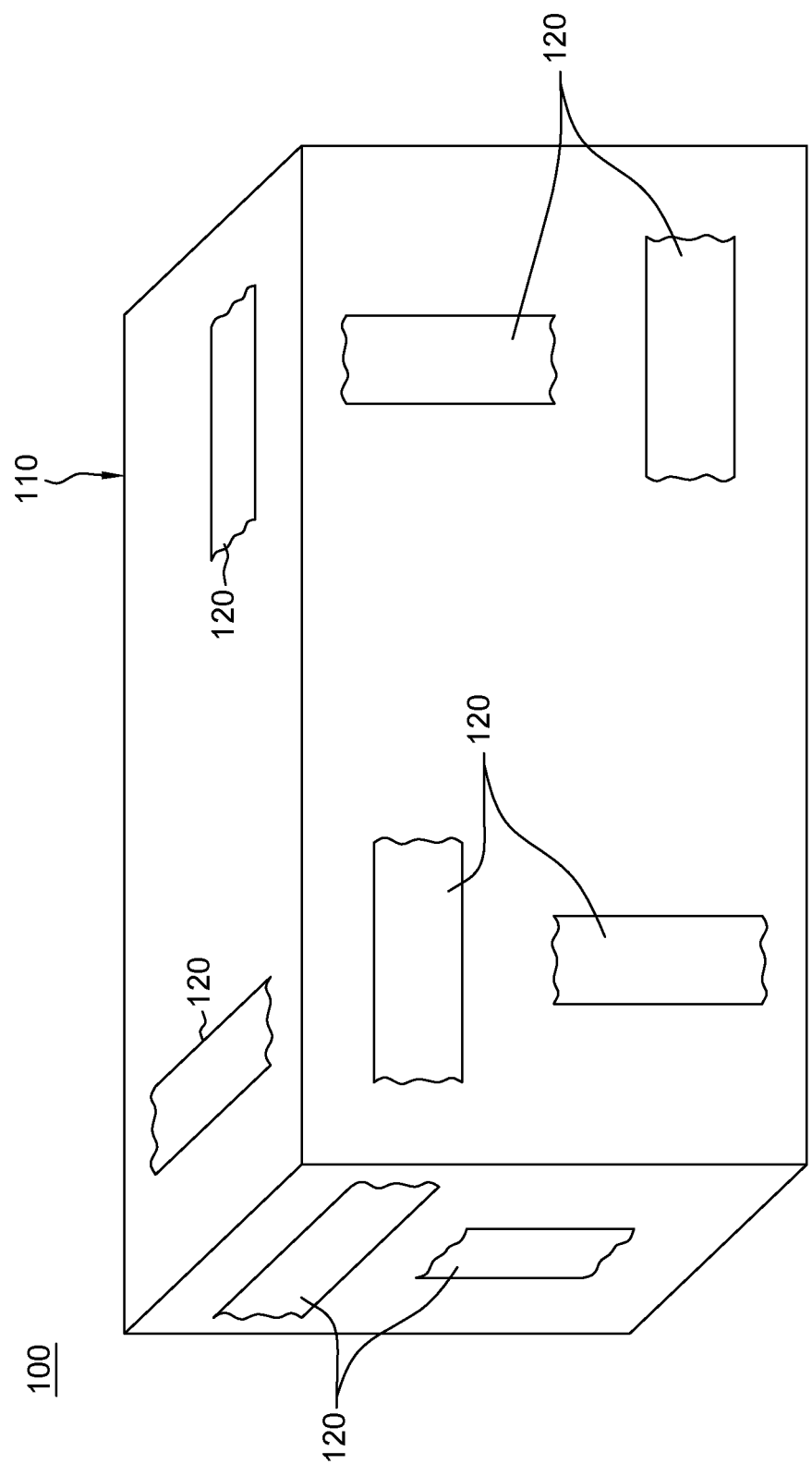
FIG. 1B depicts another embodiment of a package with impact indicators applied thereto in the form of a tape, in accordance with one or more aspects of the present invention.
Figure 1C:
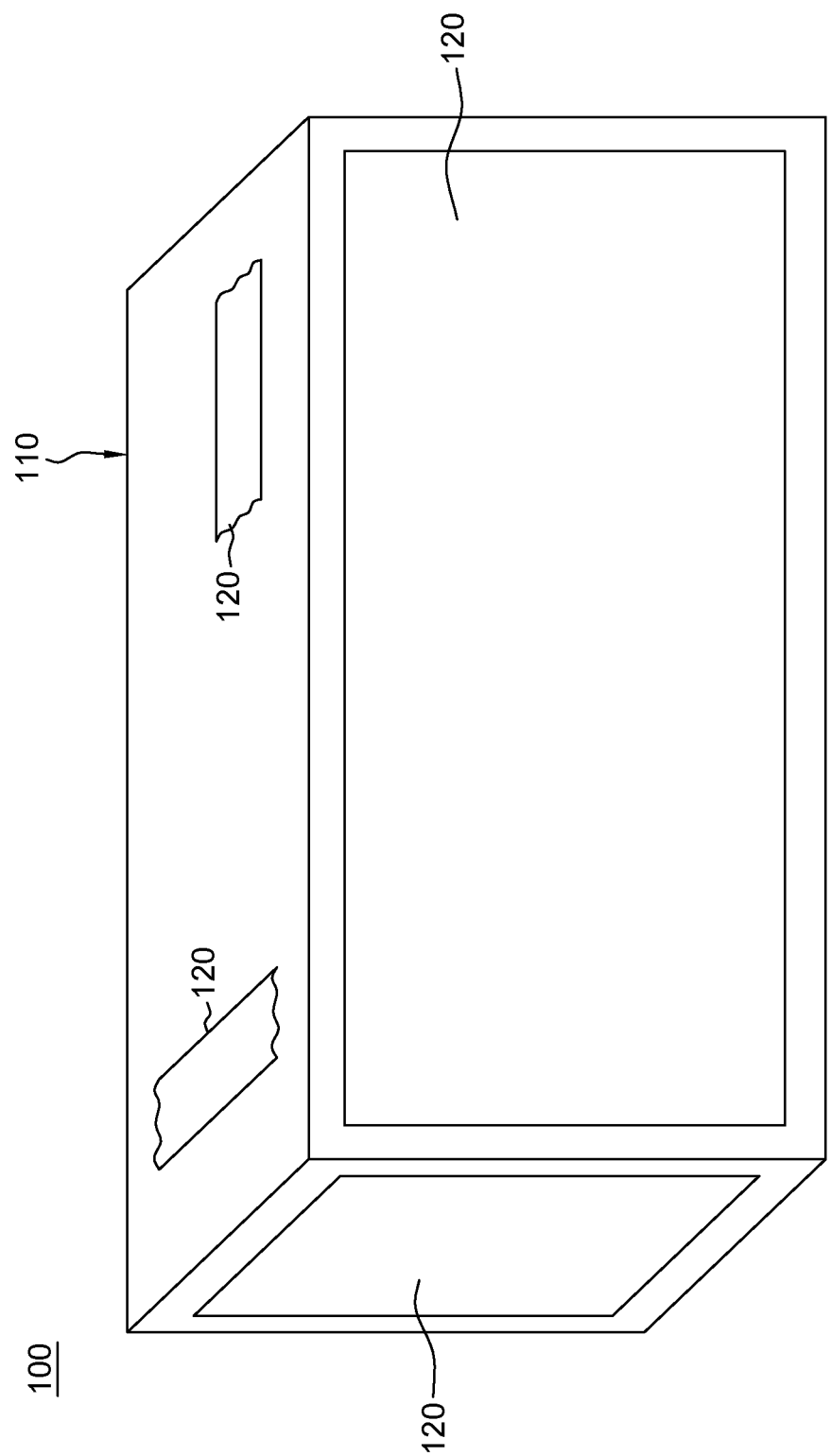
FIG. 1C depicts a further embodiment of a package with one or more impact indicators applied thereto in the form of a tape, as well as an adhesively-applied sheet, in accordance with one or more aspects of the present invention.

FIGS. 1A-1C depict various examples of an assembly 100 of a package 110 with multiple impact indicators 120 associated therewith. By way of example, in FIGS. 1A & 1B the impact indicators 120 are applied to package 110 in the form of a tape, while in FIG. 1C, one or more impact indicators 120 are in the form of an adhesively-applied sheet affixed to one or more surfaces of package 110.

Referring first to FIG. 1A, and as noted, impact indicator 120 may be applied in the form of tape segments or sections which (for instance) extend substantially the full length of one or more surfaces or sides of package 110 at any desired location on the package, with two tape strips per surface (or side) being depicted, by way of example only. In the illustration of FIG. 1B, impact indicators 120 are provided in the form of tape segments (or sections) which are applied to the different surfaces (or sides) of package 110. As illustrated in FIG. 1B, different impact indicator segments may be applied in different directions or orientations to package 110, if desired. Further, note that the impact indicators disclosed herein may be selectively placed or located on a package depending upon the contents of the package, and more particularly, depending upon the location within the package of sensitive products or components likely to be damaged with an excessive impact force of or exceeding a specified impact level. Note also that depending on the design of the impact indicator, the impact indicator may register an excessive impact force perpendicular to the surface of the package to which the indicator is attached, or parallel or coplanar to the surface of the package to which the indicator is attached.

In the embodiment of FIG. 1C, one or more of the impact indicators 120 are shown constructed in the form of a sheet sized to one or more of the different surfaces or sides of package 110 and adhesively applied to the package. Note also that, rather than constructing the impact indicator in the form of a sheet, that is, as a structure with an adhesive to be used in applying the sheet to the package, the package itself could be constructed with the impact indicator formed as part of the packaging itself. For instance, one or more outer layers of the package could be constructed to include an impact registering structure as part of the package construction.

Figure 2:
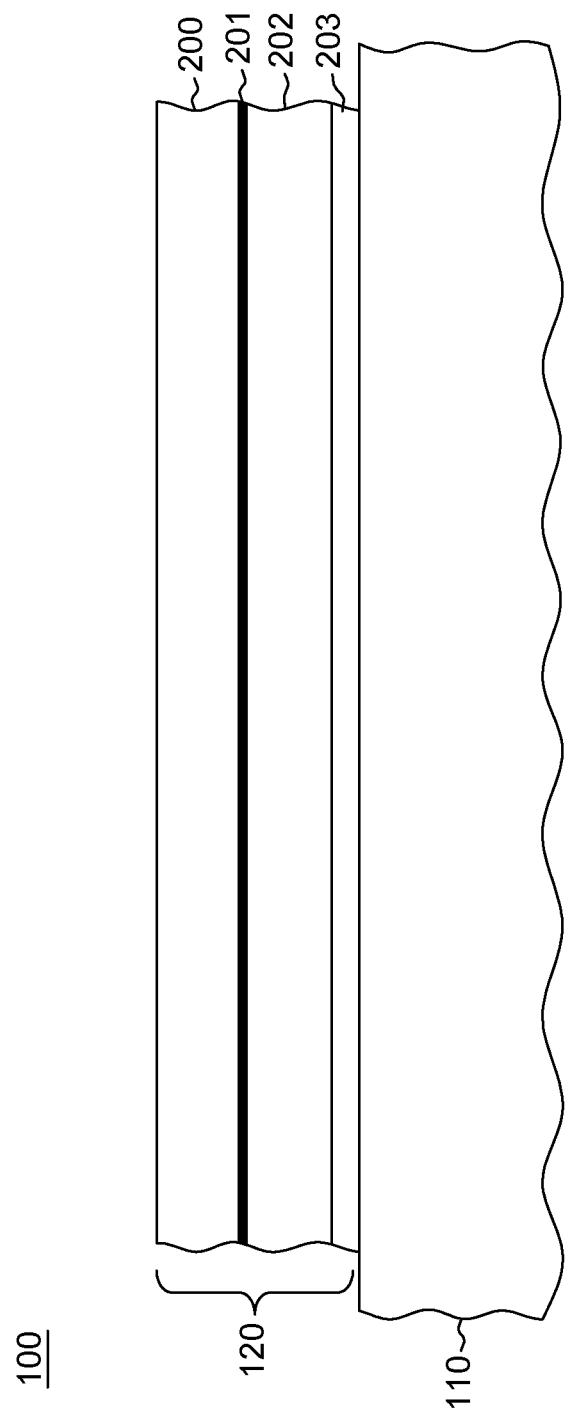
FIG. 2 is a partial cross sectional elevational view of one embodiment of an assembly including an impact indicator affixed to a package, in accordance with one or more aspects of the present invention.

FIG. 2 depicts a cross sectional elevational view of one embodiment of assembly 100 with impact indicator 120 affixed to package 110. In the embodiment depicted, impact indicator 120 includes an impact registering structure that has a first region 200, and a second region 202 separated by a barrier film 201. Further, an adhesive 203 is provided to adhere the impact registering structure to a surface or side of package 110, as illustrated. In the embodiment depicted, first region 200 and second region 202 may be first and second layers of a multilayer structure that registers a location and an elapsed time of an impact of excessive impact force on the package, in accordance with one or more aspects of the present invention. In one or more implementations, the multilayer structure may be a laminated structure such as a multilayer tape, with adhesive 203 applied to the underside as shown in order to bond the impact registering structure to the package.

In one or more embodiments, first region 200 may contain a first element, where the first element may be or including a liquid element, and second region 202 may contain a second element, where the second element may or may not be or include a liquid element. By way of example, the first element may be a colorimetric element or chemical (such as a colorimetric liquid) which changes color in a time elapsed manner when exposed to an activating agent. The second element may be or include an activating element for the colorimetric chemical. For instance, the colorimetric element or chemical may be a PH sensitive dye (such as phenolphthalein xylenol blue, nile blue A, m-cresol purple, bromocresol green, O-cresol red, cyanidine chloride, bromocresol purple, alizarin, thymol blue, bromophenol red, methyl red, acid fuchsin, brilliant yellow, logwood extract, bromothymol blue, phenol red, etc.), or a copper (Cu) or cobalt (Co) halide (such as taught in U.S. Pat. No. 3,996, 007). The activating agent for a PH sensitive chemical would be an acid or base suspended in a neutral liquid (e.g., water ($H_2O$)), such as an ammonia, or a tartaric acid.

The barrier film 201 may be a calibrated or designed barrier film that breaks at a specified level of shock, force, penetration, bending, etc. (herein, a specified impact force). By way of example, the barrier film may be a thin film in the range of, for instance, 5-25 microns, and be fabricated of flexible plastic with a relatively stiff polymer with high crystallinity, such as a flexible polyvinylchloride (PVC) with a high plasticizer content, or a polyethylene, polyester (PET), or polypropylene (PP), with similar properties, to name a few. The calibration of the film to a desired G-force value might involve both modification of the thickness, as well as the modification of the physical properties of the barrier film, such as: polymer type, amount of plasticizer, and polymer strand orientation (i.e., linear low density polyethylene). A thinner or more brittle barrier would break easier and at a lower G value than a thicker and less brittle material. The G levels that would allow these to break could be validated via controlled shock testing on a guided platen shock table, which inputs specific Gs and energy into the assembly with the barrier, in a test profile similar to that of the testing in ASTM D3332.

Further, as noted, the barrier film is calibrated, in that it is designed to rupture at a specific applied force, with the barrier film being specified or engineered for the impact indicator and the particular package or application of the indicator. For instance, different impact indicator level tapes may be produced, with one tape more sensitive than another to an impact force. Depending upon the product being shipped, and the desired sensitivity, the appropriate impact indicator tape may be used in association with the package. Identification of a specified impact force (or G-force) that may be deemed excessive on a package (and result in product damage) may be performed using conventional package testing and shock absorption processes.

Note also that a durable external layer may be used to prevent leakage or exposure to external elements of the first element or second element, with the durable external layer, for instance, encircling the first region 200 and/or second region 202, that are separated by the barrier film 201. Where the first element is a colorimetric chemical, an indicator scale may also be associated with the impact indicator to illustrate the color scale, and thereby provide an understanding of the time elapsed since a rupture event occurred when the package was subject to an excessive impact force by comparing the region of colorimetric contact to the activating agent to the scale.

Figure 3A:
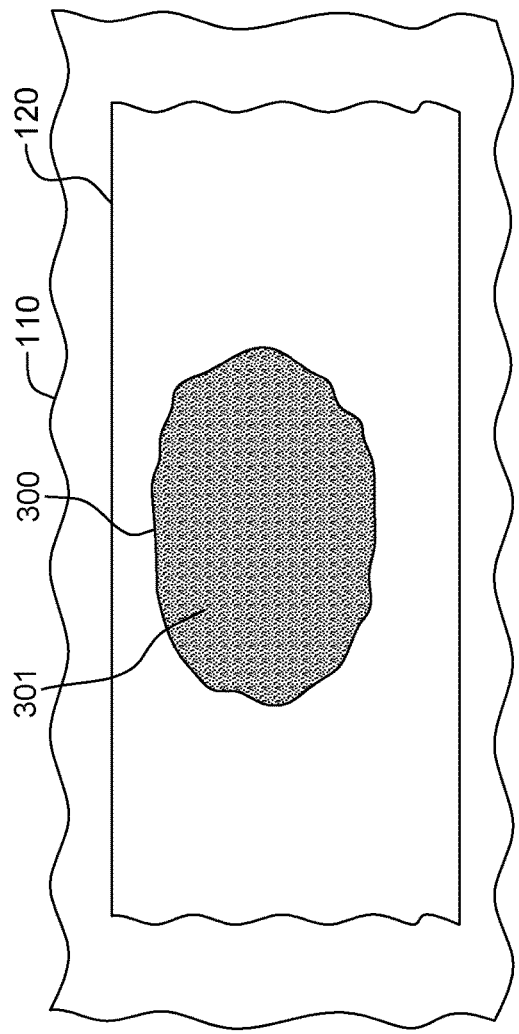
FIG. 3A is a top plan view of the assembly of FIG. 2, after being subjected to an excessive impact force, resulting in a rupture in the barrier film of the impact registering structure, and a contacting of the first and second elements of the impact registering structure, in accordance with one or more aspects of the present invention.
Figure 3B:
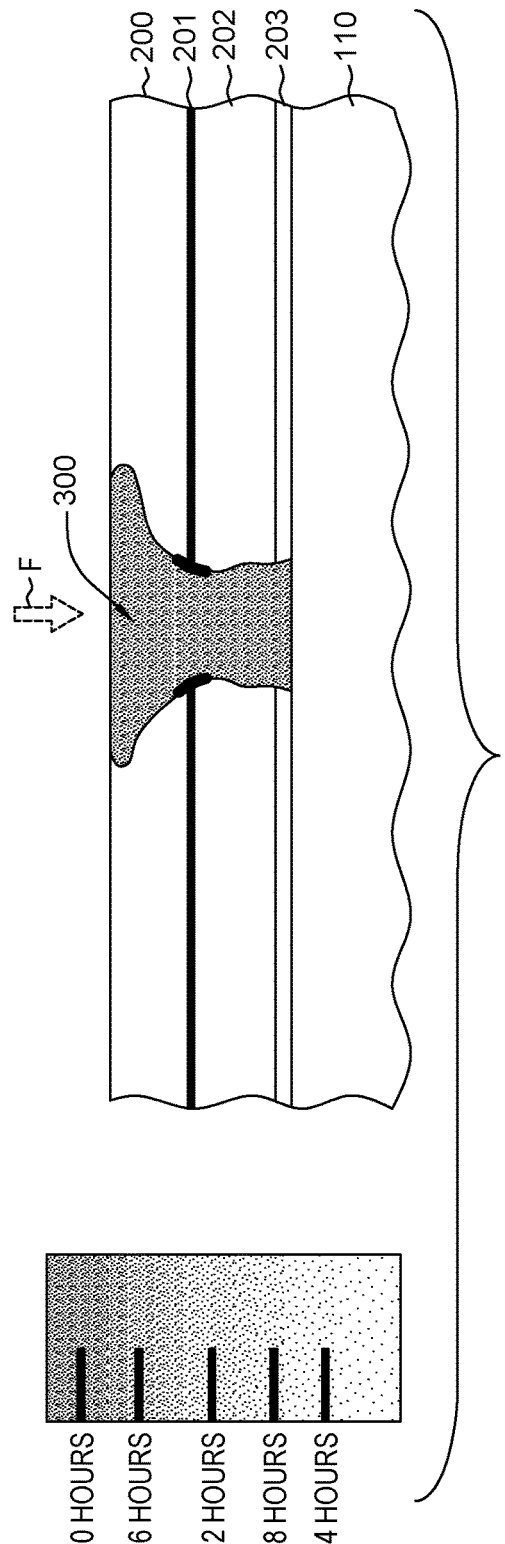
FIG. 3B is a partial cross sectional elevational view of the assembly of FIG. 3A, in accordance with one or more aspects of the present invention.

In FIGS. 3A & 3B, assembly 100 has experienced an excessive impact force, with a rupture having occurred in barrier film 201 at a particular location of the impact indicator 120 experiencing the greatest impact force. As shown in these figures, the barrier film rupture results in a region of the tape where the first and second elements come into contact. By way of example, the first element may move by osmosis from the first region into the second region with the rupture, and/or the second element may move by osmosis from the second region into the first region. Further, gravity may assist in the movement of the first and/or second element in order that the first and second elements come into contact, in part, to provide the location indication 300 of the rupture in the barrier film and a time elapsed indication 301 indicative of the elapsed time from the rupture of the barrier film. The location indication 300 is understood by a viewer as being, for instance, a center region where the first and second elements have come into contact, and in this example, where the colorimetric chemical has changed color due to exposure to the second element. As noted, a scale or index may be provided in association with impact indicator 120 or package 110 in order for the color to be readily interrupted as the indication 301 of elapsed time from the rupture in the barrier film. For instance, in the example depicted, the indication may point to 20 hours having passed since the package was subject to the excessive impact force. With this information, and with time-stamped knowledge of the parties possessing or owning the package during transit, it is possible to identify the particular party responsible at the time of the excessive impact force on the package.

For instance, assume that a server appliance is being shipped from a facility in Mexico, and the impact indicator is applied along the outside edges of the package. A neutral color of the impact indicator may be noted to ensure that the indicator has not already been activated. The package may be handed off to a first carrier to transport the package to Germany, with the package being scanned and date stamped upon handoff to the first carrier. The package may arrive in Germany, and be scanned to record a time stamped entry, where the package may be handed off to a second carrier to deliver to an end customer. The package may then be further scanned and timed stamped recorded. The package may arrive at the end customer site and the indicator tape on one of the edges may have changed colors. The color may be matched to the indicator scale showing that the excessive impact force occurred 17 hours previously. By matching the time stamps of the carrier tracking to the color indicator (in this example) it is determined, for instance, that the damage occurred while in the hands of the second carrier. With this information, the damage dispute may be readily settled and reimbursement for the damaged product may be paid by the second carrier.

Figure 4:
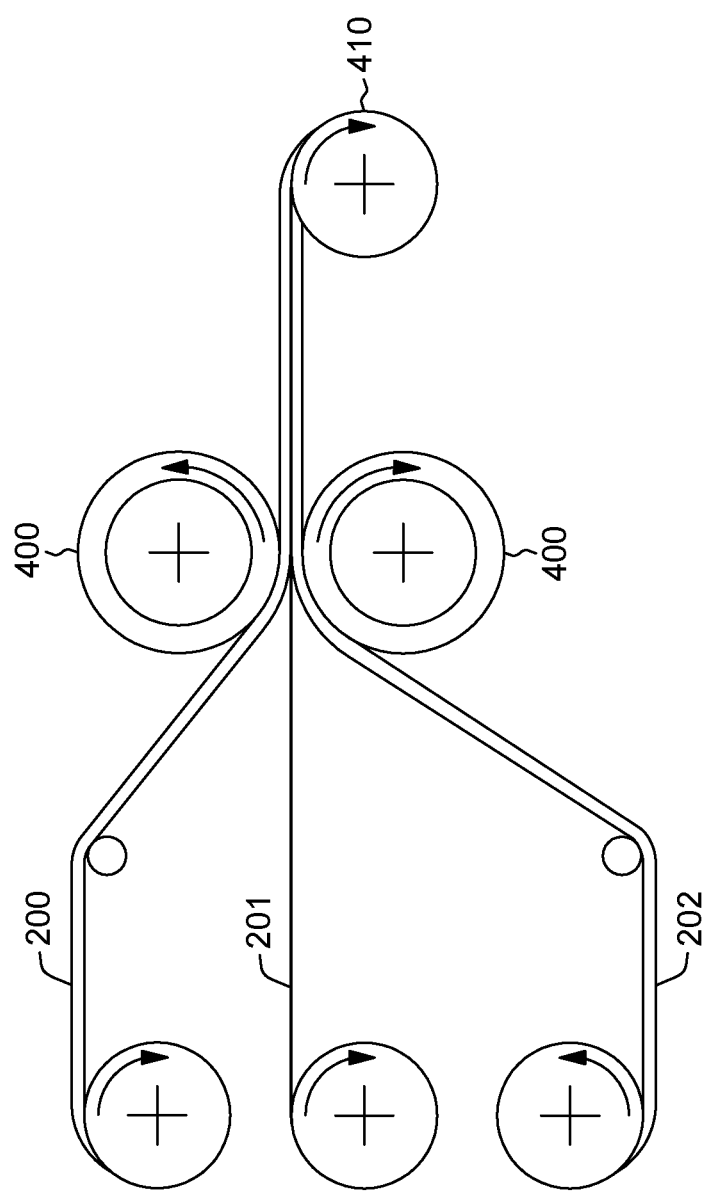
FIG. 4 depicts one embodiment of a process that may be used in fabricating an impact indicator, in accordance with one or more aspects of the present invention.

By way of example, FIG. 4 depicts one embodiment of a process for laminating the first and second regions with a barrier film therebetween into an impact registering structure, such as described herein. Referring to FIG. 4, the desired plastic films or membranes may be created, cast or blown, and wound onto respective rollers, with two or three or multiple different films being placed on the rollers of the laminator at one time. The rolls move through or along heating rolls 400 to heat up the films to facilitate adhering the films together. Chill rollers (not shown) may also be used to cool different films together during part of the lamination process. The resultant impact registering structure may then be rolled onto another roller 410, and the process can be repeated multiple times to laminate different layers, and/or different indicators with different impact ratings, as desired.

FIGS. 5A & 5B depict another embodiment of an assembly 100' including package 110 and an impact indicator 120', in accordance with one or more aspects of the present invention. In this implementation, impact indicator 120' includes a first region 500 and a second region 501 separated by a barrier film 502. The first and second regions 500, 501 are adjacent side by side regions which may be coplanar within the impact indicator, with FIGS. 5A & 5B depicting plan views of the impact indicator 120' affixed to a surface of package 110.

As shown in FIG. 5A, the impact registering structure of impact indicator 120' may include a first element 510 within first region 500, which may be a liquid element such as an indicator dye. The indicator dye may be of any type of dye or colored liquid. A general catatonic dye may be used with the liquid being either a water or oil-based liquid that may change absorption based on viscosity. The barrier film 502 may be similar in construction to the barrier films discussed above in connection with the embodiments of FIGS. 2-3B, and second region 501 may include (in this embodiment) an absorbing agent 520, which may be made of fabric, cotton, fibrous polypropylene (PP), etc. As illustrated in FIG. 5A, time elapsed lines or scaling 522 may be provided within second region 501 to be visually viewable when looking at the impact indicator 120'. For instance, the time elapsed lines may include time intervals of any desired range, such as 5-hour, 10-hour, 15-hour and 20-hour, etc., increments. The time lines used and the extent of dye absorption indicates time elapse since rupture. The intervals can vary based on determined absorption rates, which can change or be adjusted based on material, material density and/or dye viscosity used.

In FIG. 5B, a rupture in barrier film 502 between first and second regions 500, 501, has occurred. As noted, the barrier film 502 may be a plastic barrier film or seal with some tension, if desired. The barrier film may be, for instance, a 5-25-micron fiber or wire (such as plastic PET, PE, or PP) or a thin metal, or a very thin heat seal between regions 500, 501 that may be, for instance, 25 microns or less. Note that due to the coplanar nature of the first and second regions in the impact indicator 120' embodiment of FIGS. 5A & 5B, the barrier film 502 ruptures with an excessive force F being applied parallel to or coplanar with the impact indicator, in contrast to the embodiment of FIGS. 2-3A, where the excessive force F is perpendicular to the impact indicator.

Figure 6:
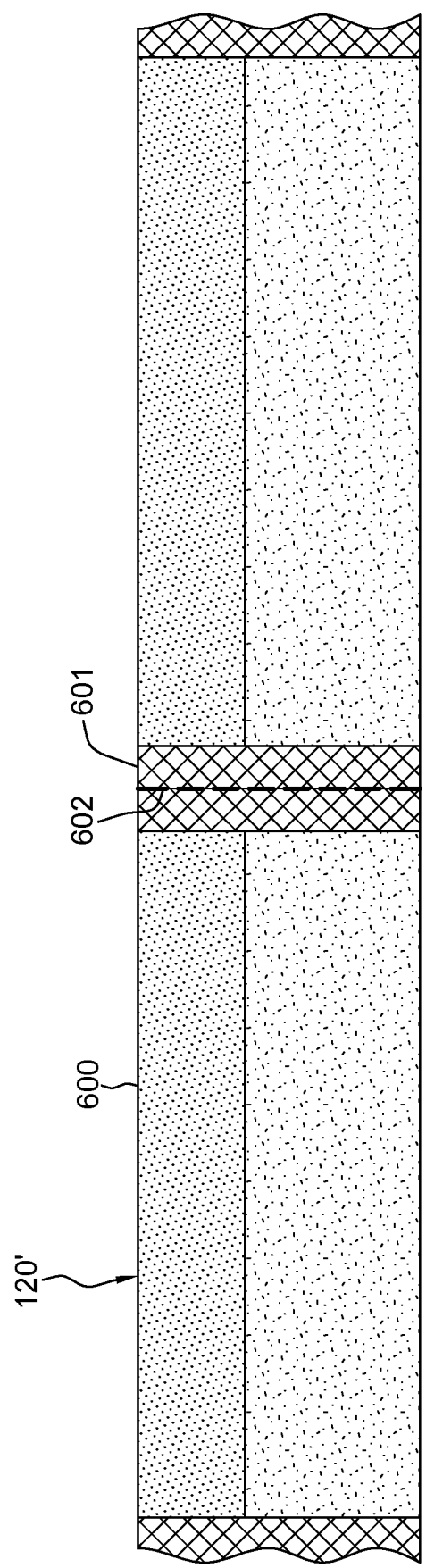
FIG. 6 depicts one embodiment of the impact indicator of FIG. 5A constructed in the form of tape sections to be adhered to a package, in accordance with one or more aspects of the present invention.

As with impact indicator 120 of FIGS. 2-3A, impact indicator 120' may be formed as a tape to be applied to one or more surfaces or sides of a package being shipped. FIG. 6 illustrates one embodiment of impact indicator 120' formed as a tape 600 with multiple tape sections separated by non-indicator regions 601, which may include a tear line or dye cut 602. Note that in one or more other embodiments, the indicator sections may be of any desired lengths, and may be configured, for instance, to extend the full length of a surface or side of a package. By way of example, the impact indicator may be formed as depicted in FIG. 6 to look more like labels, and not be continuous. For instance, the impact indicator 120' may be periodically heat sealed and dye cut to achieve the sections illustrated. Fabrication can be similar to that described above, with the liquid and absorbing agent being added in a two-piece system which fills different sides. Clear plastic outer or external films may again be used such as polyethylene, polyester (PET), polypropylene (PP), or polyvinylchloride (PVC) to name a few.

Printing may be done on an inline flexographic printer, which uses printing plates on a wheel to continuously print patterns on the surface to obtain the desired impact indicator configuration.

Those skilled in the art will note that disclosed herein are various impact indicators and methods which utilize an impact registering structure that registers a location and an elapsed time of an impact of excessive impact force on a package. Thus, with use of the impact indicators disclosed, an indication of how much time has passed since damage may have occurred to a package, as well as an approximate location of the force on the package is known. Advantageously, a receiver of the package or inspector of the package may readily be able to determine that an excessive impact force has occurred without the use of electrical sensors or powered devices, that may be expensive or costly to include in packaging, as well as require returning to a point of origin for reuse.

Advantageously, use of impact indicators such as disclosed herein provides an ability to more efficiently settle disputes over product damage at customer sites, in transit, or when being internally handled, not only reducing time taken for claim investigations, but also preventing unnecessary product reshipment over false or improper damage claims. In one or more embodiments, the impact indicator is configured as an adhesive indicator tape that indicates location and time of package damage. In one or more embodiments, the indicator includes a double layer tape with a base chemical core separated by a secondary membrane or barrier film that contains an activating agent that will cause a time sensitive, calibrated color change in the base chemical upon exposure to the activating agent. The inner membrane separating the activating agent may be calibrated to break at a specified level of shock, penetration, bending, force, etc. A durable external layer may be used to prevent leakage or exposure to external elements. In addition to this, an indicative card may be provided along with the indicator tape to show a scale and measure of time indicated by changes in color of the base chemical when exposed to the activating agent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An impact indicator for a package, the impact indicator comprising:
   a multi-layer impact registering structure to register, when associated with the package, a location and an elapsed time of an impact of excessive impact force on the package, the multi-layer impact registering structure including:
      a first layer containing a first element;
      a second layer containing a second element, wherein the first layer is a first planar layer, the second layer is a second planar layer, and the first element and the second element are selected to register location of the impact on the multi-layer impact register structure and the elapsed time of the impact when coming in contact due to the impact; and
      a barrier film isolating the first and second planar layers, the barrier film being a planar film calibrated to rupture with a specified impact force, and once ruptured, the first element and the second element contacting, in part, to provide an indication of a particular location in the multi-layer impact registering structure experiencing a greatest impact force due to the impact, and a time elapsed indication indicative of the elapsed time from the rupture in the barrier film.

2. The impact indicator of claim 1, wherein the first element of the first layer is a colorimetric element, and the second element of the second layer is an activating agent for the colorimetric element, the colorimetric element changing color in a time-elapsed manner in a region of exposure to the activating agent.

3. The impact indicator of claim 2, wherein the colorimetric element comprises a PH sensitive dye and the activating agent comprises an acid or base suspended in a neutral liquid which reacts with the colorimetric element.

4. The impact indicator of claim 1, wherein the barrier film is calibrated to rupture with the specified impact force perpendicular to the multi-layer impact registering structure.

5. The impact indicator of claim 1, wherein the first layer and the second layer are coplanar layers of the multi-layer impact registering structure separated by the barrier film.

6. The impact indicator of claim 5, wherein the first element comprises an indicator dye, and the second element an absorbing agent, wherein rupture of the barrier film results in the first element being partially absorbed into the second element, with a location of the absorption providing the location indication of the rupture in the barrier film and a rate of absorption providing the time elapsed indication indicative of elapsed time from the rupture in the barrier film.

7. The impact indicator of claim 5, wherein the barrier film is calibrated to rupture with the specified impact force planar to the multi-layer impact registering structure.

8. The impact indicator of claim 1, wherein the location indication resides, in part, within at least one of the first layer or the second layer at a position of the barrier film within the impact registering structure experiencing the excessive impact force on the package.

9. The impact indicator of claim 1, wherein the multi-layer impact registering structure further includes an adhesive on at least one side thereof to facilitate adhering the multi-layer impact registering structure to the package.

10. The impact indicator of claim 9, wherein the adhesive is coupled to at least one of the first layer or the second layer of the multi-layer impact registering structure.

11. An assembly comprising:
a package; and
an impact indicator associated with the package, the impact indicator comprising:
a multi-layer impact registering structure coupled to the package for registering a location and an elapsed time of an impact of excessive impact force on the package, the multi-layer impact registering structure including:
a first layer containing a first element;
a second layer containing a second element, wherein the first layer is a first planar layer, the second layer is a second planar layer, and the first element and the second element are selected to register the location of the impact on the multi-layer impact register structure and the elapsed time of the impact when coming in contact due to the impact; and
a barrier film isolating the first and second planar layers, the barrier film being a planar film calibrated to rupture with a specified impact force, and once ruptured, the first element and the second element contacting, in part, to provide an indication of a particular location in the multi-layer impact registering structure experiencing a greatest impact force due to the impact, and a time elapsed indication indicative of the elapsed time from the rupture in the barrier film.

12. The assembly of claim 11, wherein the first element of the first layer is a colorimetric element, and the second element of the second layer is an activating agent for the colorimetric element, the colorimetric element changing color in a time-elapsed manner in a region of exposure to the activating agent.

13. The assembly of claim 12, wherein the barrier film is calibrated to rupture with the specified impact force perpendicular to the multi-layer impact registering structure.

14. The assembly of claim 11, wherein the first layer and the second layer are coplanar layers of the multi-layer impact registering structure separated by the barrier film.

15. The assembly of claim 14, wherein the first element comprises an indicator dye, and the second element an absorbing agent, wherein rupture of the barrier film results in the first element being partially absorbed into the second element, with a location of the absorption providing the location indication of the rupture in the barrier film and a rate of absorption providing the time elapsed indication indicative of elapsed time from the rupture in the barrier film.

16. The assembly of claim 14, wherein the barrier film is calibrated to rupture with the specified impact force planar to the multi-layer impact registering structure.

17. A method of fabricating an impact indicator for a package, the method comprising:
providing a multi-layer impact registering structure to register, when associated with the package, a location and an elapsed time of an impact of excessive impact force on the package, the providing including:
providing a first layer containing a first element;
providing a second layer contain a second element, wherein the first layer is a first planar layer, the second layer is a second planar layer, and the first element and the second element are selected to register location of the impact on the multi-layer impact register structure and the an elapsed time of the impact when coming in contact due to the impact; and
isolating the first and second planar layers by a barrier film, the barrier film being a planar film calibrated to rupture with a specified impact force, and once ruptured, the first element and the second element contacting, in part, to provide an indication of a particular location in the multi-layer impact registering structure experiencing a greatest impact force due to the impact, and a time elapsed indication indicative of the elapsed time from the rupture.

18. The method of claim 11, wherein the first element of the first layer is a colorimetric element, and the second element of the second layer is an activating agent for the colorimetric element, the colorimetric element changing color in a time-elapsed manner in a region of exposure to the activating agent.

19. The method of claim 17, wherein the first layer and the second layer are coplanar layers of the multi-layer impact registering structure separated by the barrier film and wherein the first element comprises an indicator dye, and the second element an absorbing agent, wherein rupture of the barrier film results in the first element being partially absorbed into the second element, with a location of the absorption providing the location indication of the rupture in the barrier film and a rate of absorption providing the time elapsed indication indicative of elapsed time from the rupture in the barrier film.

\* \* \* \* \*